United States Patent
Abraham

(10) Patent No.: US 9,820,218 B2
(45) Date of Patent: Nov. 14, 2017

(54) SYSTEMS AND METHODS FOR EFFICIENT ACCESS POINT DISCOVERY

(71) Applicant: QUALCOMM Incorporated, San Diego, CA (US)

(72) Inventor: Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/957,212

(22) Filed: Dec. 2, 2015

(65) Prior Publication Data
US 2016/0165519 A1   Jun. 9, 2016

Related U.S. Application Data

(60) Provisional application No. 62/088,444, filed on Dec. 5, 2014.

(51) Int. Cl.
| | | |
|---|---|---|
| H04W 48/08 | (2009.01) | |
| H04L 1/00 | (2006.01) | |
| H04W 48/12 | (2009.01) | |

(52) U.S. Cl.
CPC .......... *H04W 48/08* (2013.01); *H04L 1/0061* (2013.01); *H04W 48/12* (2013.01)

(58) Field of Classification Search
CPC ...... H04W 48/08; H04W 48/12; H04L 1/0061
See application file for complete search history.

(56) References Cited

U.S. PATENT DOCUMENTS

| | | | |
|---|---|---|---|
| 2005/0195781 A1* | 9/2005 | Ikeda | H04W 48/12 370/338 |
| 2013/0111044 A1 | 5/2013 | Cherian et al. | |
| 2013/0201980 A1* | 8/2013 | Rahul | H04W 88/08 370/338 |
| 2013/0223308 A1* | 8/2013 | Chandra | H04W 52/0229 370/311 |
| 2013/0294232 A1* | 11/2013 | Segev | H04W 28/06 370/230 |
| 2014/0010233 A1 | 1/2014 | Takase et al. | |
| 2014/0078949 A1* | 3/2014 | Chu | H04W 52/0209 370/311 |
| 2014/0192809 A1* | 7/2014 | Park | H04W 48/16 370/392 |
| 2014/0337950 A1* | 11/2014 | Yang | H04W 12/08 726/7 |

(Continued)

OTHER PUBLICATIONS

International Search Report and Written Opinion—PCT/US2015/063672—ISA/EPO—dated Mar. 9, 2016.

(Continued)

*Primary Examiner* — Mohammad Anwar
(74) *Attorney, Agent, or Firm* — Knobbe, Martens, Olson & Bear, LLP

(57) ABSTRACT

Systems, methods, and devices provide for efficient access point discovery. One implementation generates a wireless frame to include a first indication of a service set identifier of the access point, and a second indication of a format of the first indication. The frame is then transmitted on a wireless medium. In some aspects, the first indication is a hash of a service set identifier of the access point, for example, a cyclic redundancy check (CRC) value of the service set identifier.

40 Claims, 8 Drawing Sheets

(56) References Cited

U.S. PATENT DOCUMENTS

2015/0098459 A1* 4/2015 Lee .................. H04W 48/16
 370/338

OTHER PUBLICATIONS

Merlin S., "Short Beacon; 11-12-0129-03-00ah-short-beacon", IEEE SA Mentor; 11-12-0129-03-00AH-Short-Beacon, IEEE-SA Mentor, Piscataway, N, USA, vol. 802.11ah, No. 3, May 14, 2012 (May 14, 2012.), pp. 1-21, XP068038246, [retrieved on May 14, 2012].

* cited by examiner

SYSTEMS AND METHODS FOR EFFICIENT ACCESS POINT DISCOVERY

CROSS-REFERENCE TO RELATED APPLICATIONS

This application claims priority to U.S. Provisional Application No. 62/088,444, filed Dec. 5, 2014, and entitled "SYSTEMS AND METHODS FOR EFFICIENT ACCESS POINT DISCOVERY." The disclosure of this prior application is considered part of this application, and is hereby incorporated by reference in its entirety.

BACKGROUND

Field

The present application relates generally to wireless communication systems and more specifically to systems, methods, and devices for fast initial network link setup within wireless communication systems.

Background

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or when the network architecture is formed in an ad hoc, rather than fixed, topology. A mobile network element such as a wireless station (STA) and an access point (AP) can exchange messages through a process of link setup for utilizing the network. Under certain conditions, many STAs can attempt to use the network during a short period of time. For example, when several STAs move into the vicinity of a new network, the network can experience an increased rate of link setup process collisions creating undesirable latencies in the link setup. Accordingly, there is a need for a fast initial link setup in a wireless communication network.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One aspect of this disclosure provides a method for communicating data in a wireless communications network. The method includes generating, by an access point, a frame comprising a first indication of a service set identifier of the access point, and a second indication of a format of the first indication; and transmitting the generated frame. In some aspects, the method further comprises hashing the service set identifier; and generating the first indication to have a value equivalent to the hash. In some aspects, the method also comprises generating the second indication to have a value indicating the frame includes a hashed service set identifier. In some aspects, hashing the service set identifier comprises generating a four octet cyclic redundancy check (CRC) value based on the service set identifier. In some aspects, the method also includes generating the second indication to have a value indicating the frame includes a full length service set identifier; and generating the frame to include the service set identifier. In some aspects, the method also includes periodically transmitting the generated frame. In some aspects, the generated frame is transmitted at a time interval of less than 500 milliseconds. In some aspects, the method includes generating the frame as a fast initial link setup discovery frame.

Another aspect disclosed is an apparatus for communicating on a wireless network. The apparatus includes a processor configured to generate, by an access point, a frame comprising a first indication of a service set identifier of the access point, and a second indication of a format of the first indication, and a transmitter configured to transmit the generated frame.

In some aspects, the processor is further configured to: hash the service set identifier, and generate the first indication to have a value equivalent to the hash. In some aspects, the processor is further configured to generate the second indication to have a value indicating the frame includes a hashed service set identifier. In some aspects, hashing the service set identifier comprises generating a four octet cyclic redundancy check (CRC) value based on the service set identifier. In some aspects, the apparatus, the processor is further configured to generate the second indication to have a value indicating the frame includes a full length service set identifier, and generate the frame to include the service set identifier. In some aspects, the processor is further configured to periodically transmit the generated frame. In some aspects, the generated frame is transmitted at a time interval of less than 500 milliseconds.

In some aspects of the apparatus, the processor is further configured to generate the frame as a fast initial link setup discovery frame.

Another aspect disclosed is an apparatus for communicating on a wireless network. The apparatus includes means for generating, by an access point, a frame comprising: a first indication of a service set identifier of the access point, and a second indication of a format of the first indication; and means for transmitting the generated frame. In some aspects, the apparatus also includes means for hashing the service set identifier; and means for generating the first indication to have a value equivalent to the hash. In some aspects, the apparatus also includes means for generating the second indication to have a value indicating the frame includes a hashed service set identifier. In some aspects of the apparatus, the means for hashing the service set identifier is configured to generate a four octet cyclic redundancy check (CRC) value based on the service set identifier. In some aspects, the apparatus also includes means for generating the second indication to have a value indicating the frame includes a full length service set identifier; and means for generating the frame to include the service set identifier. In some aspects, the apparatus also includes means for periodically transmitting the generated frame. In some aspects of the apparatus the means for periodically transmitting the generated frame is configured to generate and transmit the frame at a time interval of less than 500 milliseconds. Some aspects of the apparatus also include means for generating the frame as a fast initial link setup discovery frame.

Another aspect disclosed is a computer readable storage medium comprising instructions that when executed cause a processor to perform a method of communicating on a wireless network, the method includes generating, by an access point, a frame comprising a first indication of a service set identifier of the access point, and a second indication of a format of the first indication; and transmitting the generated frame. In some aspects, the method further comprises hashing the service set identifier; and generating the first indication to have a value equivalent to the hash. In some aspects, the method also comprises generating the second indication to have a value indicating the frame includes a hashed service set identifier. In some aspects, hashing the service set identifier comprises generating a four octet cyclic redundancy check (CRC) value based on the service set identifier. In some aspects, the method also includes generating the second indication to have a value indicating the frame includes a full length service set identifier; and generating the frame to include the service set identifier. In some aspects, the method also includes periodically transmitting the generated frame. In some aspects, the generated frame is transmitted at a time interval of less than 500 milliseconds. In some aspects, the method includes generating the frame as a fast initial link setup discovery frame.

Another aspect disclosed is a method of communicating on a wireless network. The method includes receiving, from an access point, a frame comprising a first indication of a service set identifier of the access point, and a second indication of a format of the first indication, decoding the first indication based on the second indication to determine the service set identifier of the access point; and communicating with the access point based on the determined service set identifier of the access point.

In some aspects, the method also includes determining a length of the first indication based on the second indication. In some aspects of the method, communicating with the access point comprises associating with the access point. In some aspects of the method communicating with the access point comprises including the decoded first indication in one or more message exchanges with the access point.

Another aspect disclosed is an apparatus for communicating on a wireless network. The apparatus includes a receiver configured to receive, from an access point, a frame comprising: a first indication of a service set identifier of the access point, and a second indication of a format of the first indication; and a processor configured to: decode the first indication based on the second indication to determine the service set identifier of the access point, and communicate with the access point based on the determined service set identifier of the access point.

In some aspects of the apparatus, the processor is further configured to determine a length of the first indication based on the second indication. In some aspects of the apparatus, communicating with the access point comprises associating with the access point. In some aspects of the apparatus, communicating with the access point comprises including the decoded first indication in one or more message exchanges with the access point.

Another aspect disclosed is an apparatus for communicating on a wireless network. The apparatus includes means for receiving, from an access point, a frame comprising a first indication of a service set identifier of the access point, and a second indication of a format of the first indication, means for decoding the first indication based on the second indication to determine the service set identifier of the access point; and means for communicating with the access point based on the determined service set identifier of the access point.

Some aspects of the apparatus also include means for determining a length of the first indication based on the second indication. Some aspects of the apparatus also include means for communicating is configured to associate with the access point based on the first indication. In some aspects of the apparatus, the means for communicating is configured to include the decoded first indication in one or more message exchanges with the access point.

Another aspect disclosed is a computer readable storage medium comprising instructions that when executed cause a processor method of communicating on a wireless network, the method includes receiving, from an access point, a frame comprising a first indication of a service set identifier of the access point, and a second indication of a format of the first indication. The method also includes decoding the first indication based on the second indication to determine the service set identifier of the access point; and communicating with the access point based on the determined service set identifier of the access point.

In some aspects of the computer readable storage medium, the method also includes determining a length of the first indication based on the second indication. In some aspects of the computer readable storage medium, the method also includes communicating with the access point comprises associating with the access point. In some aspects of the computer readable storage medium, communicating with the access point comprises including the decoded first indication in one or more message exchanges with the access point.

DETAILED DESCRIPTION

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Figure 1:
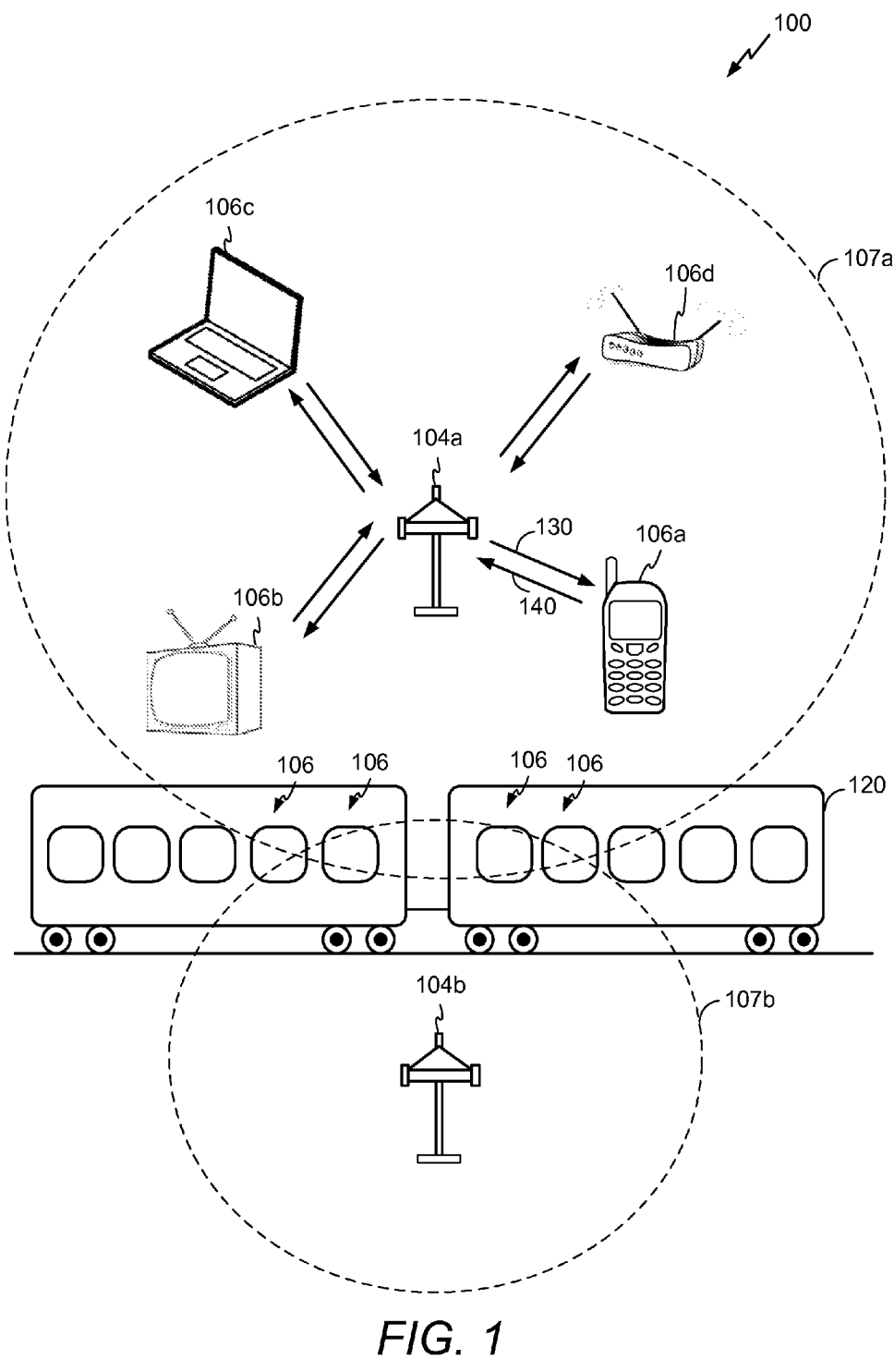
FIG. 1 shows an exemplary wireless communication system in which aspects of the present disclosure can be employed.

FIG. 1 shows an exemplary wireless communication system 100 in which aspects of the present disclosure can be employed. The wireless communication system 100 includes an access point (AP) 104a, which communicates with a plurality of stations (STAs) 106a-106d in a basic service area (BSA) 107a. The wireless communication system 100 can further include a second AP 104b which can communicate in a BSA 107b. One or more STAs 106 can move in and/or out of the BSAs 107a-107b, for example, via a train 120. In various embodiments described herein, the STAs 106 and 106a-106d can be configured to quickly establish wireless links with the AP 104a and/or 104b, particularly when moving into the BSAs 107a and/or 107b.

To provide for quick establishment of wireless links with the AP 104a and/or 104b, the APs 104a-b may periodically transmit a discovery frame identifying the presence of the transmitting access point. In some aspects, the transmitted frame identifying the access point may be a fast initial link setup (FILS) discovery frame. Upon receiving the discovery frame, the STAs 106a-d may be configured to establish a connection with the identified AP 104a-b.

To provide for rapid identification of an access point soon after a STA moves within its range, the APs 104 and/or 104b may transmit the discovery frames at a relatively short interval, for example, in some aspects, at a frequency of 100, 200, 300, 400, or 500 milliseconds. In some aspects, the frequency of transmission of the discovery frames may be less than 100 milliseconds. Because the discovery frames may be transmitted frequently, their transmission may consume a significant portion of capacity on the wireless medium. Therefore, it may be beneficial to provide for a reduced size discovery frame to mitigate the amount of network capacity utilized by periodic transmission of access point discovery frames. As described in greater detail herein, the devices 106 and 104a-104b can implement various techniques to reduce overhead associated with the periodic transmission of discovery frames, and thereby enhance network performance.

In various embodiments, the wireless communication system 100 can include a wireless local area network (WLAN). The WLAN can be used to interconnect nearby devices, employing one or more networking protocols. The various aspects described herein can apply to any communication standard, such as IEEE 802.11 wireless protocols. For example, the various aspects described herein can be used as part of the IEEE 802.11a, 802.11b, 802.11g, 802.11n, 802.11ah, and/or 802.11ai protocols. Implementations of the 802.11 protocols can be used for sensors, home automation, personal healthcare networks, surveillance networks, metering, smart grid networks, intra- and inter-vehicle communication, emergency coordination networks, cellular (e.g., 3G/4G) network offload, short- and/or long-range Internet access (e.g., for use with hotspots), machine-to-machine (M2M) communications, etc.

The APs 104a-104b can serve as a hub or base station for the wireless communication system 100. For example, the AP 104a can provide wireless communication coverage in the BSA 107a, and the AP 104b can provide wireless communication coverage in the BSA 107b. The AP 104a and/or 104b can include, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, or some other terminology.

The STAs 106 and 106a-106d (collectively referred to herein as STAs 106) can include a variety of devices such as, for example, laptop computers, personal digital assistants (PDAs), mobile phones, etc. The STAs 106 can connect to, or associate with, the APs 104a-104b via a WiFi (e.g., IEEE 802.11 protocol such as 802.11ai) compliant wireless link to obtain general connectivity to the Internet or to other wide area networks. The STAs 106 may also be referred to as "clients."

In various embodiments, the STAs 106 can include, be implemented as, or be known as access terminals (ATs), subscriber stations, subscriber units, mobile stations, remote stations, remote terminals, user terminals (UTs), terminals, user agents, user devices, user equipment (UEs), or some other terminology. In some implementations, a STA 106 can include a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The AP 104a, along with the STAs 106a-106d associated with the AP 104a, and that are configured to use the AP 104a for communication, can be referred to as a basic service set (BSS). In some embodiments, the wireless communication system 100 may not have a central AP 104a. For example, in some embodiments, the wireless communication system 100 can function as a peer-to-peer network between the STAs 106. Accordingly, the functions of the AP 104a described herein can alternatively be performed by one or more of the STAs 106. Moreover the AP 104a can implement one or more aspects described with respect to the STAs 106, in some embodiments.

A communication link that facilitates transmission from the AP 104a to one or more of the STAs 106 can be referred to as a downlink (DL) 130, and a communication link that facilitates transmission from one or more of the STAs 106 to the AP 104a can be referred to as an uplink (UL) 140. Alternatively, a downlink 130 can be referred to as a forward link or a forward channel, and an uplink 140 can be referred to as a reverse link or a reverse channel.

A variety of processes and methods can be used for transmissions in the wireless communication system 100 between the AP 104a and the STAs 106. In some aspects, wireless signals can be transmitted using orthogonal frequency-division multiplexing (OFDM), direct-sequence spread spectrum (DSSS) communications, a combination of OFDM and DSSS communications, or other schemes. For example, signals can be sent and received between the AP 104a and the STAs 106 in accordance with OFDM/OFDMA processes. Accordingly, the wireless communication system 100 can be referred to as an OFDM/OFDMA system. As another example, signals can be sent and received between the AP 104a and the STAs 106 in accordance with CDMA processes. Accordingly, the wireless communication system 100 can be referred to as a CDMA system.

Aspects of certain devices (such as the AP 104a and the STAs 106) implementing such protocols can consume less power than devices implementing other wireless protocols. The devices can be used to transmit wireless signals across a relatively long range, for example about one kilometer or longer. As described in greater detail herein, in some embodiments, devices can be configured to establish wireless links faster than devices implementing other wireless protocols.

Association and Authentication

Generally, in IEEE 802.1X protocols, authentication takes place between a STA and an authentication server (e.g., a server that provides authentication services, such as identity verification, authorization, privacy, and non-repudiation). For example, the AP, which functions as an authenticator, relays messages between the AP and the authentication server during the authentication process. In some instances, the authentication messages between the STA and the AP are transported using extensible authentication protocol over local area network (EAPOL) frames. EAPOL frames may be defined in the IEEE 802.11i protocol. The authentication messages between the AP and the authentication server may be transported using the remote authentication dial in user service (RADIUS) protocol or the Diameter authentication, authorization, and accounting protocol.

Figure 2:
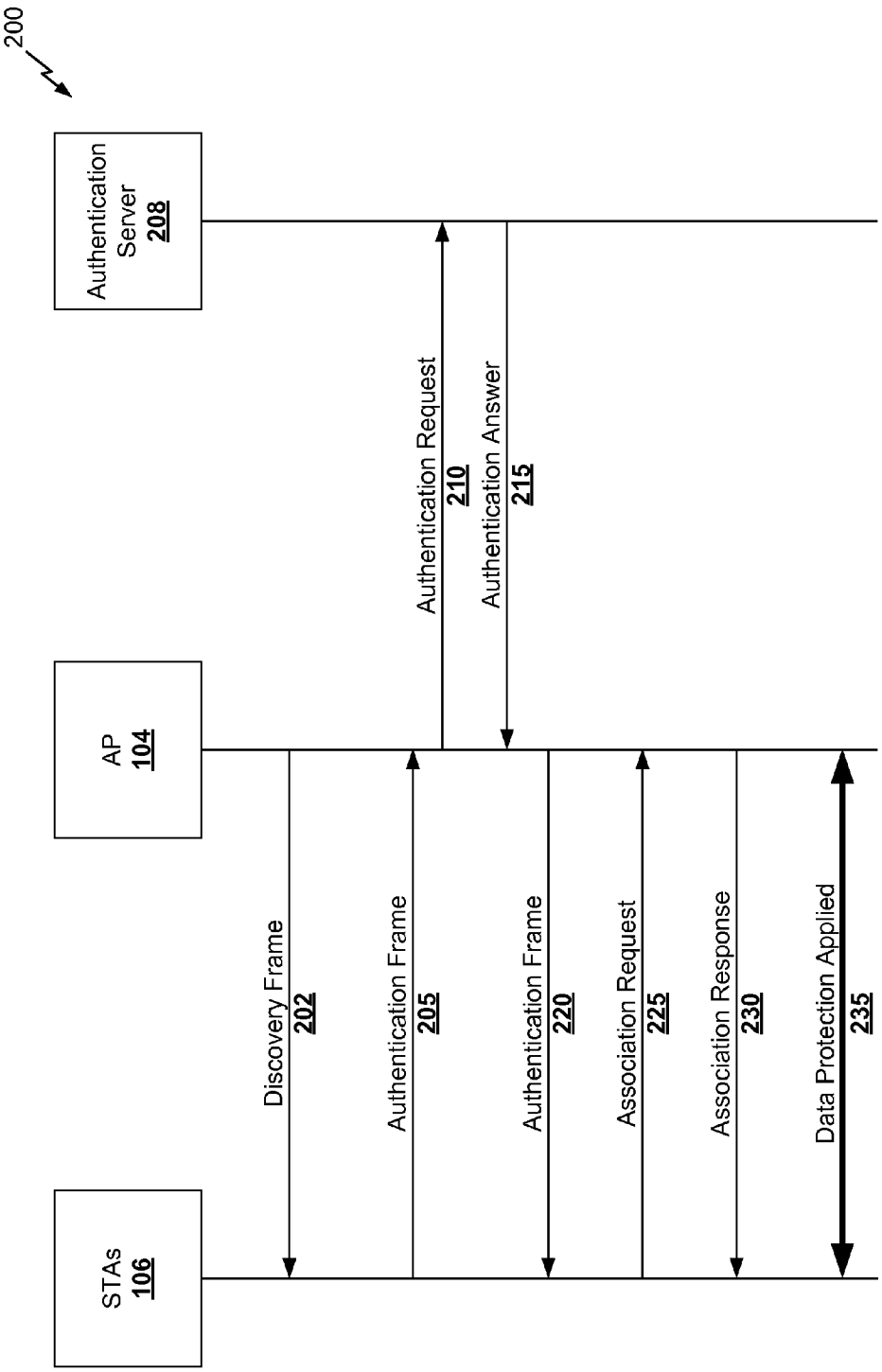
FIG. 2 shows a communication exchange in a fast initial link setup (FILS) wireless communication system.

FIG. 2 shows a communication exchange 200 in a FILS wireless communication system. Signaling is shown, according to various embodiments, between one or more STAs 106 and 106a-106d, one or more APs 104a-104b, and an authentication server 208 during authentication and association in an IEEE 802.11ai network.

As illustrated in FIG. 2, the AP 104 first transmits a discovery frame 202. The discovery frame 202 may in some aspects be a fast initial link setup (FILS) discovery frame. The discovery frame 202 may indicate the presence of the AP 104 to one or more devices receiving the discovery frame, such as STAs 106 shown in FIG. 2. For example, the discovery frame may include a service set identifier (SSID) of the AP 104. The service set identifier may at least partially enable one or more STAs 106 to establish communications with the AP 104. As discussed above, in order to facilitate rapid establishment of communications between an STA and the AP 104 when the STA moves into range of the AP 104, the AP 104 may transmit the discovery frame 202 periodically. A shorter periodicity between a first discovery frame 202 and a second discovery frame (not shown) can provide for reduced elapsed time in establishing communication with the AP 104.

As illustrated in FIG. 2, the STA 106 transmits an authentication frame 205 to the AP 104. The authentication frame 205 may be an EAPOL frame that includes an extensible authentication protocol (EAP) re-authentication initiation message (e.g., which is part of the EAP Re-authentication Protocol).

Based on receiving the authentication frame 205, the AP 104 may transmit an authentication request 210 to the authentication server 208. The authentication request 210 may be an authentication, authorization, and accounting (AAA) EAP Request (e.g., an EAP payload), which may include the EAP re-authentication initiation message.

Once the authentication server 208 is ready to respond, the authentication server 208 may transmit an authentication answer 215 to the AP 104. The authentication answer 215 may be an AAA EAP Answer (e.g., an EAP payload), which may include an indication of whether authentication succeeded or failed. For example, the indication of whether authentication succeeded or failed may be an EAP success message or an EAP failure message. The authentication answer 215 may also include a pairwise master key (PMK), which is distributed to the AP 104 and used to encrypt traffic.

Upon receiving the authentication answer 215, the AP 104 may transmit an authentication frame 220 to the STA 106. The authentication frame 220 may be an EAPOL frame and include an EAP finish-re-authentication message (e.g., which is part of the EAP Re-authentication Protocol), which indicates whether authentication succeeded or failed.

After receiving the authentication frame 220, the STA 106 may transmit an association request 225 to the AP 104 in order to associate with the AP 104. The association request 225 may be an EAPOL frame and include a key confirmation. If association is successful, the AP 104 may respond with an association response 230. The association response 230 may be an EAPOL frame and include a key confirmation and/or a group-key distribution, which can be used to encrypt traffic. Once the STA 106 is associated with the AP 104, data protection 235 is applied for communications between the STA 106 and the AP 104.

As discussed above, periodic transmission of a discovery frame may allow stations moving within range of an access point to establish communication with the access point. However, because the discovery frames may be transmitted with some frequency, substantial portions of network capacity may be consumed by their transmission. Thus, it may be beneficial to reduce the size of the discovery frame to reduce network overhead associated with their transmission.

Figure 3:
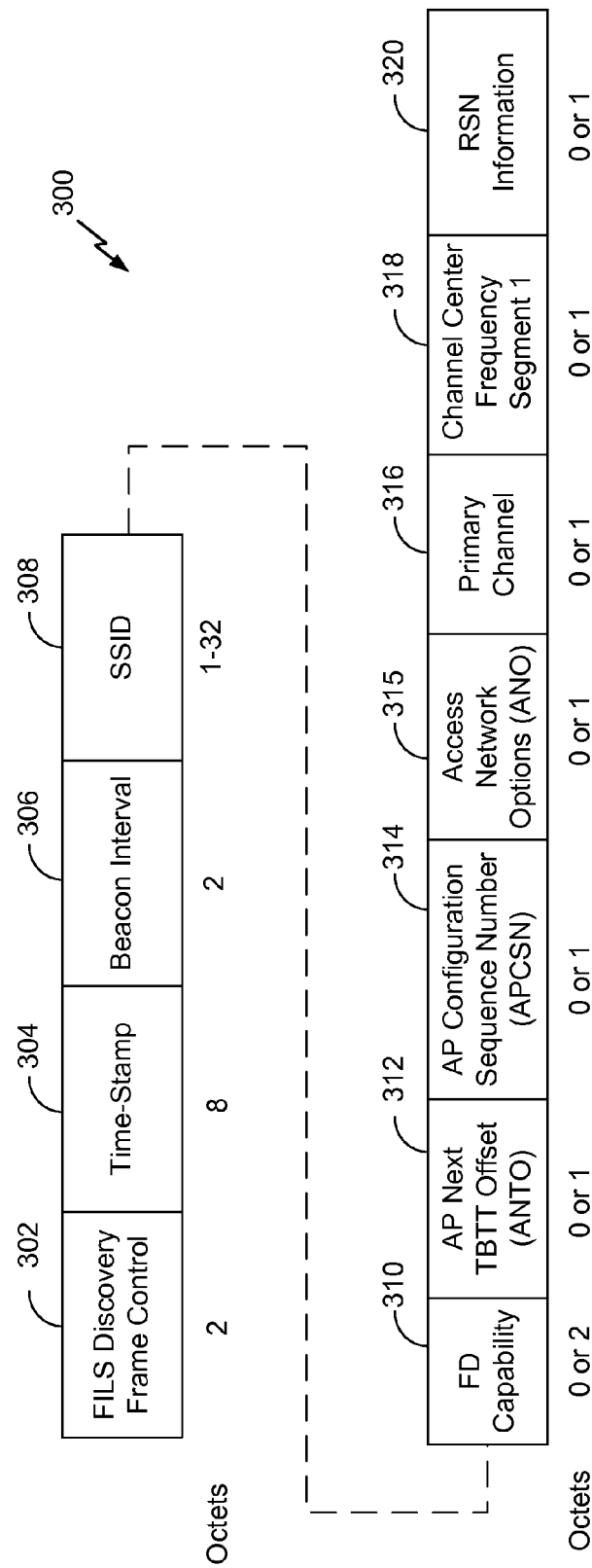
FIG. 3 shows an exemplary message format of a discovery frame.

FIG. 3 is a message format of a discovery frame. The discovery frame 300 includes a fast initial link setup discovery frame control field 302, a time-stamp field 304, a beacon interval field 306, and a service set identifier (SSID) field 308. The discovery frame 202 shown in FIG. 2 may conform to the format of discovery frame 300 in some aspects. Various embodiments of the discovery frame control field 302 are described with respect to FIGS. 4 and 5. The time-stamp field 304 may store a time reference. The beacon interval field 306 may indicate a periodicity at which the frame 300 is transmitted. The service set identifier (SSID) field 308 may store data the service set identifier for a device transmitting the frame 300.

The discovery frame 300 may optionally include one or more of a full-duplex (FD) capability field 310, access point next target beacon transmission time (TBTT) offset (ANTO) field 312, an access point configuration sequence number field (AP-CSN) 314, an access network options field 315, a primary channel field 316, a channel center frequency segment 1 field 318, and an RSN information field 320.

Figure 4:
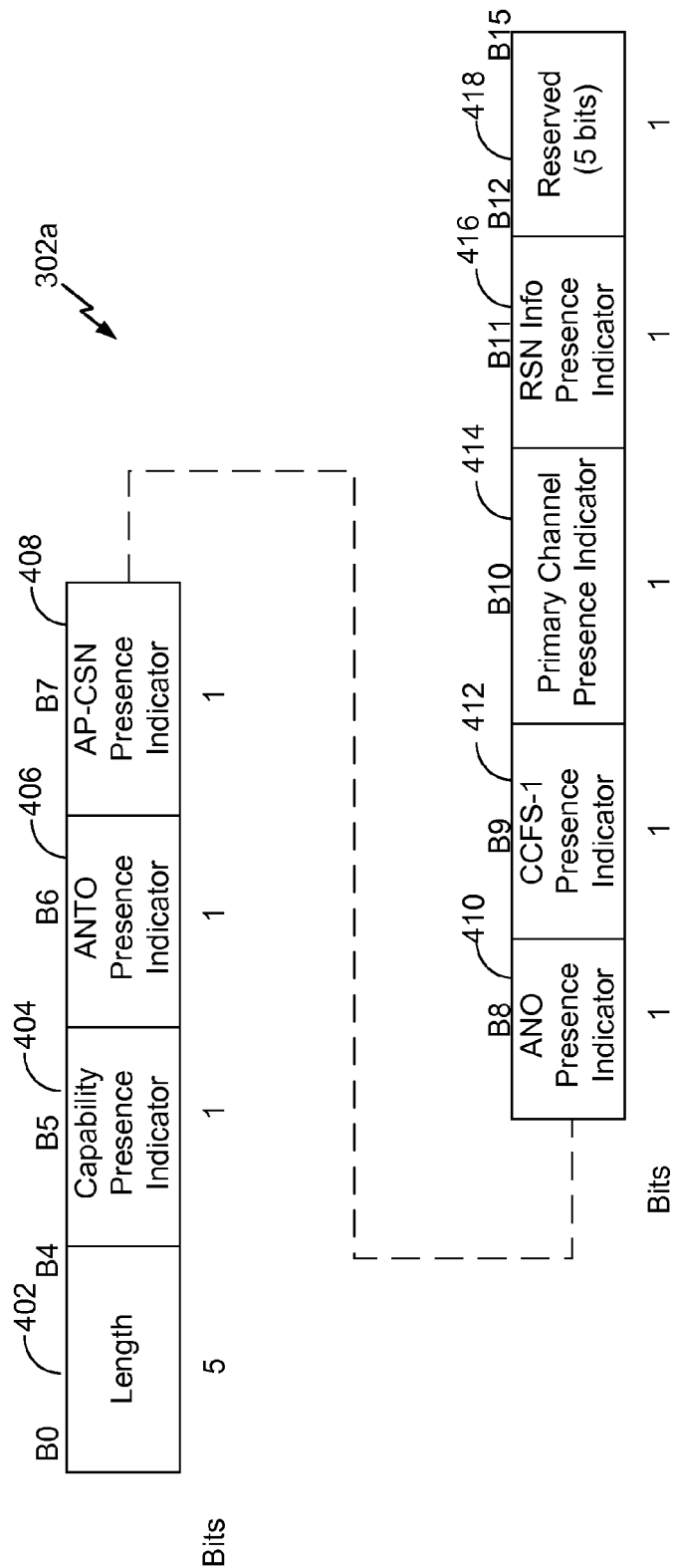
FIG. 4 shows an exemplary message format of a discovery frame control field.

FIG. 4 is a message format of the discovery frame control field 302 shown in FIG. 3. The discovery frame control field 302a includes a length field 402, a capability presence indicator field 404, an ANTO presence indicator field 406, an AP-CSN presence indicator field 408, an access network options (ANO) presence indicator field 410, a Channel Center Frequency Segment 1 (CCFS-1) presence indicator field 412, a primary channel presence indicator field 414, a Robust Secure Network (RSN) info presence indicator field 416, and five (5) reserved bits 418. The length field 402 may indicate the length of the SSID field 308. The 5-bit length field 402 indicates the length of the SSID field 308 in the frame, in unit of octets. The value of this field plus 1 is equal to the length of the SSID field. The capability presence indicator field 404 is one bit in length. A value of one (1) indicates that the FD capability field 310 is present in the frame 300. A value of zero (0) indicates that the FD capability field 310 is not present in the frame 300. The ANTO Presence indicator field 406 is one bit in length. A value of one (1) indicates that the ANTO Presence indicator field 406 indicates that the ANTO field 312 is present in the frame 300, otherwise, a value of zero (0) indicates that the ANTO field 312 is not present in the frame 300. The AP-CSN Presence Indicator field 408 indicates whether the access point configuration sequence number (AP-CSN) field 314 is present in the frame 300. A value of one (1) indicates that the AP-CSN field 314 is present in the frame 300, otherwise, a value of zero (0) indicates that the AP-CSN field 314 is not present in the frame 300. The ANO Presence indicator field 410 indicates whether the access network options (ANO) field 315 is present in the frame 300. A value of one (1) indicates that the Access Network Options (ANO) field 315 is present in the frame 300, otherwise, a value of zero (0) indicates that the Access Network Options (ANO) field 315 is not present in the frame 300. The Channel Center Frequency Segment 1 (CCFS-1) presence indicator field 412 indicates whether the channel center frequency segment 1 field 318 is present in the frame 300. A value of one (1) indicates that the channel center frequency segment 1 field 318 is present in the frame 300, otherwise, a value of zero (0) indicates that the channel center frequency segment 1 field 318 is not present in the frame 300. The primary channel presence indicator field 414 indicates whether the primary channel field 316 is present in the frame 300. A value of one (1) indicates that the primary channel field 316 is present in the frame 300, otherwise, a value of zero (0) indicates that the primary channel field 316 is not present in the frame 300. The RSN info presence indicator field 416 indicates whether the RSN information field 320 is present in the frame 300. A value of one (1) indicates that the RSN information field 320 is present in the frame 300, otherwise, a value of zero (0) indicates that the RSN information field 320 is not present in the frame 300.

Figure 5:
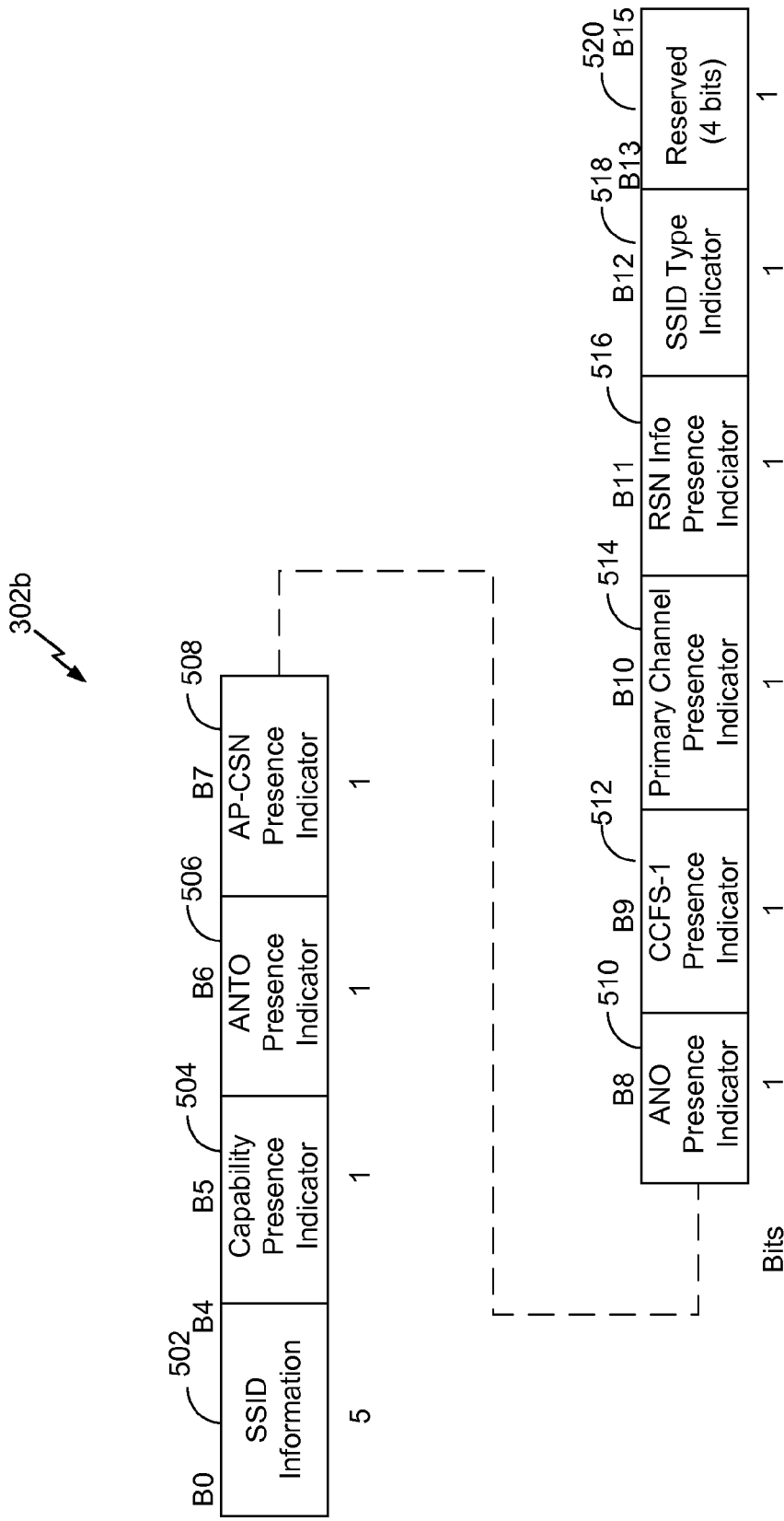
FIG. 5 shows an exemplary message format of an enhanced discovery frame control field.

FIG. 5 is an enhanced discovery frame control field 302b. The enhanced discovery frame control field 302b includes a service set identifier information field 502, a capability presence indicator field 504, an ANTO presence indicator field 506, an AP-CSN presence indicator field 508, an access network options (ANO) presence indicator field 510, a Channel Center Frequency Segment 1 (CCFS-1) presence indicator field 512, a primary channel presence indicator field 514, an Robust Secure Network (RSN) info presence indicator field 516, a service set identifier (SSID) type indicator field 518, and four (4) reserved bits 520. Each of the capability presence indicator field 504, the ANTO presence indicator field 506, the AP-CSN presence indicator field 508, the access network options (ANO) presence indicator field 510, the Channel Center Frequency Segment 1 (CCFS-1) presence indicator field 512, the primary channel presence indicator field 514, and the Robust Secure Network (RSN) info presence indicator field 516 perform similar functions as the corresponding fields in discovery frame control field 302a.

In some aspects the SSID type indicator field 518 may indicate a format of the service set identifier provided in field 308 of the discovery frame 300 of FIG. 3. How the SSID type indicator field 518 is used to indicate a format of the service set identifier provided in field 308 may vary by embodiment. In some aspects, the SSID type indicator field 518 is used as described by Table 1 below:

TABLE 1

| SSID Type Indicator Field 518 Value | Description | SSID Information Field 502 |
|---|---|---|
| Zero (0) | Thirty Two (32) byte SSID present in field 308 | B0-B4 of SSID Information field 502: Set to length in octets of the SSID field 308 |
| One (1) | Other type SSID field present in field 308 | B0 = 0: Compressed SSID present in SSID Information field 308<br>B0 = 1: Reserved<br>B1-B4: Reserved |

In some aspects, the compressed SSID indicated by the combination of values of the SSID type indicator field 518 and B0 of the SSID information field 502 may be a hash of a full thirty two (32) byte SSID. In some aspects, the hash may be a four octet cyclic redundancy check value of the thirty two (32) byte SSID.

In some other aspects, use of the SSID Type Indicator field 518 may conform to that shown in Table 2 below:

TABLE 2

| SSID Type Indicator Field 518 Value | Description | SSID Information Field 502 |
|---|---|---|
| Zero (0) | Thirty Two (32) byte SSID present in field 308 | B0-B4 of SSID Information field 502: Set to length in octets of the SSID field 308 |
| One (1) | CRC based compressed SSID present | B0-B4 reserved |

In some other aspects, use of the SSID Type Indicator field 518 may conform to that shown in Table 3 below:

TABLE 3

| SSID Type Indicator Field 518 Value | Description | SSID Information Field 502 |
|---|---|---|
| Zero (0) | Thirty Two (32) byte SSID present in field 308 | B0-B4 of SSID Information field 502: Set to length in octets of the SSID field 308 |
| One (1) | Other type SSID field present in field 308 | B0 = 0: Compressed SSID present in SSID Information field 308<br>B0 = 1: Truncated service set identifier (SSID) consisting of abbreviated SSID or first 4 octets of the full SSID<br>B1-B4: Reserved |

In some other aspects, use of the SSID Type Indicator field 518 may conform to that shown in Table 4 below:

TABLE 4

| SSID Type Indicator Field 518 Value | Description | SSID Information Field 502 |
| --- | --- | --- |
| Zero (0) | Full 32 byte SSID present in field 308 | B0-B4: Set to length in octets of the SSID field 308 |
| One (1) | SSID less than 32 bytes present in field 308 | B0-B4 reserved |

When compared to Table 1, Table 4 describes a simplified solution that may implement a fixed length compressed SSID when the type indicator field 518 has a particular value.

One of ordinary skill would understand that the values provided in Tables 1-4 are merely exemplary and other implementations are contemplated that could use different specific values. For example, the values shown for the SSID type indicator field 518 in Tables 1 to 4 could be reversed in some implementations. Additionally, in some aspects, the ordinal position and/or size of each of the fields in the enhanced discovery frame control field 302b may vary from the exemplary implementation shown in FIG. 5.

Components of an AP and/or STA

Figure 6:
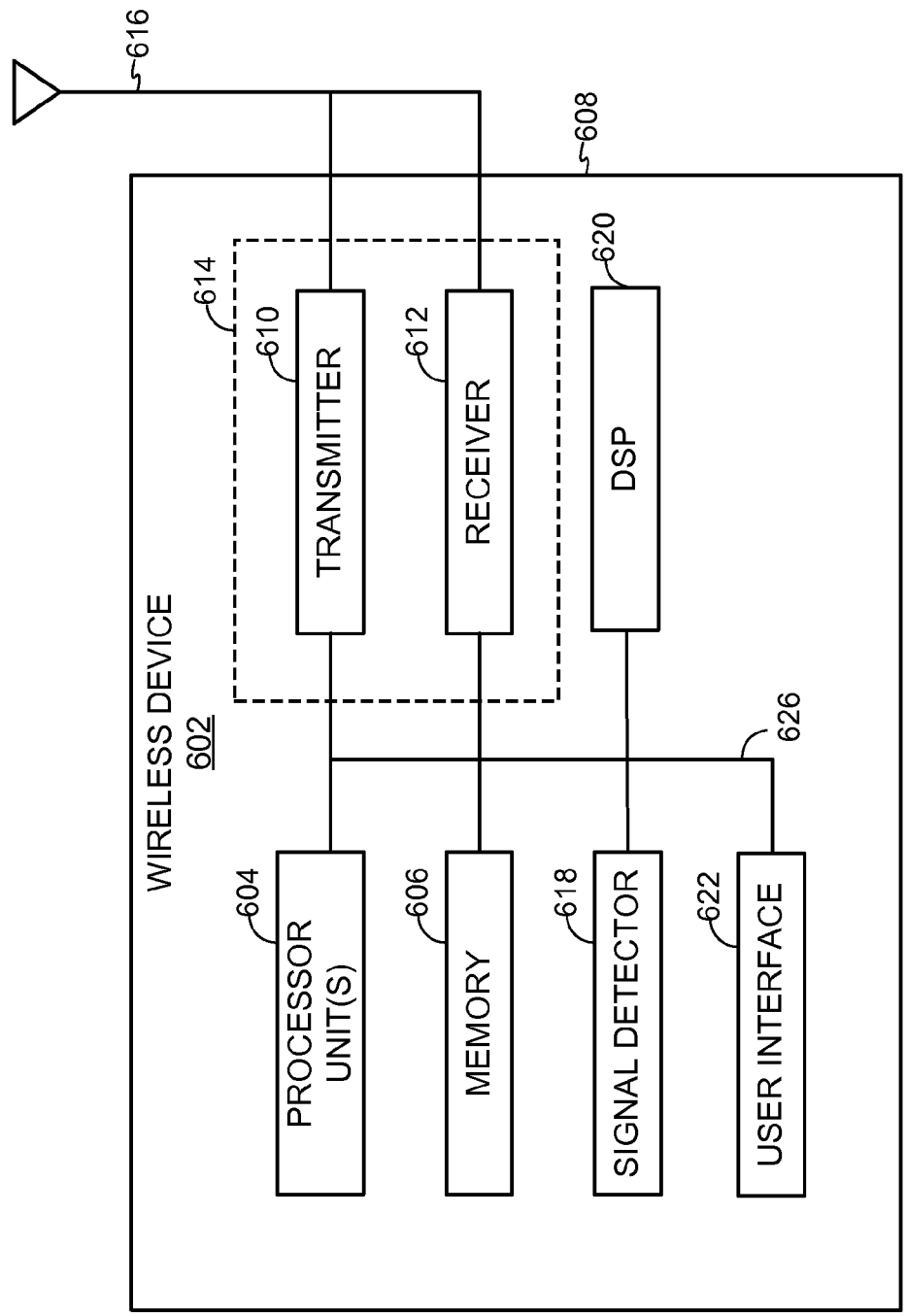
FIG. 6 shows a functional block diagram of an exemplary a wireless device that can be employed within the wireless communication system of FIG. 1.

FIG. 6 shows a functional block diagram of an exemplary a wireless device 602 that can be employed within the wireless communication system 100 of FIG. 1. The wireless device 602 is an example of a device that can be configured to implement the various methods described herein. For example, the wireless device 602 can include the AP 104 and/or one of the STAs 106.

The wireless device 602 can include one or more processor units 604 which are configured to control operation of the wireless device 602. One or more of the processor units 604 can be collectively referred to as a central processing unit (CPU) and/or processor. A memory 606, which may include one or more of read-only memory (ROM) and random access memory (RAM), provides instructions and data to the processor units 604. A portion of the memory 606 can also include non-volatile random access memory (NVRAM). The processor units 604 can be configured to perform logical and arithmetic operations based on program instructions stored within the memory 606. The processor 604 can be configured to implement one or more methods described herein, for example in conjunction with executable instructions in the memory 606.

When the wireless device 602 is implemented or used as an AP, the processor 604 can be configured to expedite the discovery of the AP by a STA and the creation of a link with a STA. The processor 604 can be further configured to reduce contention for AP resources. For example, a high volume of STAs requesting access can cause packet collisions or dropping of packets. Various processes to expedite connection and improve resource utilization are described in further detail herein.

When the wireless device 602 is implemented or used as a STA, the processor units 604 can be configured to expedite the discovery of an AP and the creation of a link with the AP. The processor units 604 can be further configured to reduce contention for AP resources. For example, through passive listening, a STA can acquire the information needed to establish a link with an AP without directly requesting the information from the AP. This and various other processes to expedite connection and improve resource utilization are described in further detail below.

The processor units 604 can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. In an implementation where the processor units 604 include a DSP, the DSP can be configured to generate a packet (e.g., a data packet) for transmission. In some aspects, the packet can include a physical layer data unit (PPDU).

The wireless device 602 can also include machine-readable media for storing software. The processing units 604 can include one or more machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the processor units 604, cause the wireless device 602 to perform the various functions described herein.

The wireless device 602 can include a transmitter 610 and/or a receiver 612 to allow transmission and reception, respectively, of data between the wireless device 602 and a remote location. The transmitter 610 and receiver 612 can be combined into a transceiver 614. An antenna 616 can be attached to the housing 608 and electrically coupled with the transceiver 614. The wireless device 602 can also include (not shown) multiple transmitters, multiple receivers, multiple transceivers, and/or multiple antennas.

The transmitter 610 can be configured to wirelessly transmit packets and/or signals. For example, the transmitter 610 can be configured to transmit different types of packets generated by the processor units 604, discussed above. The packets are made available to the transmitter 610. For example, the processor units 604 can store a packet in the memory 606 and the transmitter 610 can be configured to retrieve the packet. Once the transmitter retrieves the packet, the transmitter 610 transmits the packet to a STA 106 wireless device 602 via the antenna 616.

An antenna 616 on the STA 106 wireless device 602 detects wirelessly transmitted packets/signals. The STA 106 receiver 612 can be configured to process the detected packets/signals and make them available to the processor units 604. For example, the STA 106 receiver 612 can store the packet in memory 606 and the processor units 604 can be configured to retrieve the packet.

The wireless device 602 can also include a signal detector 618 that can be used in an effort to detect and quantify the level of signals received by the transceiver 614. The signal detector 618 can detect such signals as total energy, energy per subcarrier per symbol, power spectral density, and other signals. The wireless device 602 can also include a digital signal processor (DSP) 620 for use in processing signals. The DSP 620 can be configured to generate a packet for transmission. In some aspects, the packet can include a physical layer data unit (PPDU).

The wireless device 602 can further include a user interface 622 in some aspects. The user interface 622 can include a keypad, a microphone, a speaker, and/or a display. The user interface 622 can include any element or component that conveys information to a user of the wireless device 602 and/or receives input from the user. The wireless device 602 can also include a housing 608 surrounding one or more of the components included in the wireless device 602.

The various components of the wireless device 602 can be coupled together by a bus system 626. The bus system 626 can include a data bus, for example, as well as a power bus, a control signal bus, and a status signal bus in addition to the data bus. Those of skill in the art will appreciate the components of the wireless device 602 can be coupled together or accept or provide inputs to each other using some other mechanism.

Although a number of separate components are illustrated in FIG. 6, those of skill in the art will recognize that one or more of the components can be combined or commonly implemented. For example, the processor units 604 can be used to implement not only the functionality described above with respect to the processor units 604, but also to implement the functionality described above with respect to the signal detector 618. Further, each of the components illustrated in FIG. 6 can be implemented using a plurality of separate elements.

Figure 7:
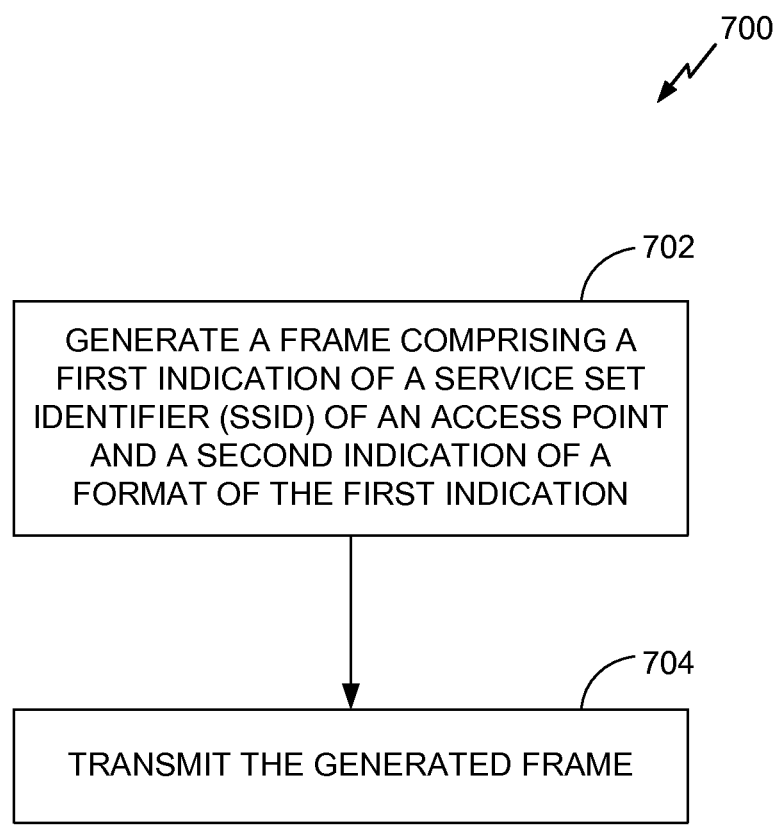
FIG. 7 is a flowchart of a process for communicating data in the wireless communications system of FIG. 1.

FIG. 7 is a flowchart of a process 700 for communicating data in the wireless communications system of FIG. 1. In some aspects, process 700 may be performed by the device 602, discussed above. For example, in some aspects, the memory 606 may store instructions that configure the processor 604 to perform one or more of the functions described below with respect to process 700. In an embodiment, the process 700 may be performed by an AP, such as the AP 104.

As discussed above, because a fast initial link setup (FILS) discovery frame may be transmitted frequently over a wireless medium in order to ensure rapid discovery of an access point, these transmissions can consume a substantial portion of a wireless medium's available capacity. Therefore, reducing the side of a FILS discovery frame can substantially improve available capacity on a wireless medium, well beyond what might be suggested by a relatively small size reduction of a single FILS discovery frame.

At block 702, a frame is generated. The frame is generated to include a first indication of a service set identifier of an access point and a second indication of a format of the first indication. In some aspects, the frame may be generated to conform with the format of discovery frame 300 shown in FIG. 3, with the FILS discovery frame control field 302 substantially conforming with the format of enhanced discovery frame control field 302*b*, shown in FIG. 5. In these aspects, the first indication may be generated in one or more bits of the SSID field 308. In these aspects, the second indication may be generated in one or more bits of the SSID type indicator field 518, shown in FIG. 5.

In some aspects, the second indicator is generated to indicate the first indication is a thirty two (32) byte service set identifier. For example, as shown in the tables 1 and 2 above, in some aspects, the SSID Type indicator field 518 may be set to zero to indicate a thirty two (32) byte service set identifier is provided in the first indication, which may be the contents of SSID field 308 shown in FIG. 3. In these aspects, the frame is generated to include the thirty two (32) byte service set identifier, in some aspects, in field 308 of FIG. 3.

In some aspects, the second indicator is generated to indicate the first indication is a hash of a thirty two (32) byte service set identifier. For example, as shown in Tables 1 and 2 above, the SSID type indicator field 518 may be set to a value of one (1) in some aspects to indicate a compressed SSID of a length less than thirty two octets is provided in field 308. In some aspects, the second indication may indicate the first indicator is a four octet cyclic redundancy check value that is based on the thirty two (32) byte service set identifier. In these aspects, the frame is generated to include the hash of the thirty two (32) byte service set identifier. In some aspects, the hash is provided in field 308 of frame 300, shown in FIG. 3. One of ordinary skill should understand upon review of this disclosure that the frame generated in block 702 may conform to any of the specifications disclosed in Tables 1-4 above.

In some aspects, the frame is generated to indicate the presence of the device transmitting the frame. For example, in some aspects, the frame may be a fast initial link setup discovery frame. In some aspects, block 702 may be performed by the processor 604 shown in FIG. 6. In some aspects, block 702 may be performed by one or more of the processor 604, signal detector 618, transmitter 610, receiver 612, and/or DSP 620. In some aspects, generating the frame may include determining a portion of memory 606 that is unused and available for storing the generated frame. A starting position within the memory 606 for the frame may also be determined. The portion of the memory 606 may then be initialized or written to in order to set the bit values of the memory portion to represent the frame as described above.

In block 704, the generated frame is transmitted. In some aspects, the frame may be generated and transmitted at a periodicity, for example, every 100, 200, 300, 400, or 500 milliseconds. In some aspects, the frame is generated and transmitted at a frequency greater than once every 100 milliseconds. In some aspects, block 704 may be performed by the transmitter 610 shown in FIG. 6. In some aspects, block 704 may be performed by one or more of the processor 604, signal detector 618, transmitter 610, receiver 612, and/or DSP 620. In some aspects, transmitting the generated frame may include signaling the transmitter 610 that the frame is ready for transmission. For example, in some aspects, the processor 604 may write data to one or more registers of the transmitter 610 to indicate a starting location of the frame within the memory 606. Another register of the transmitter 610 may be written to indicate the transmission should be performed from the indicated starting location. Alternatively, in some aspects, the processor 604 may generate an interrupt signal to the transmitter 610 to initiate the transmission of the frame.

Figure 8:
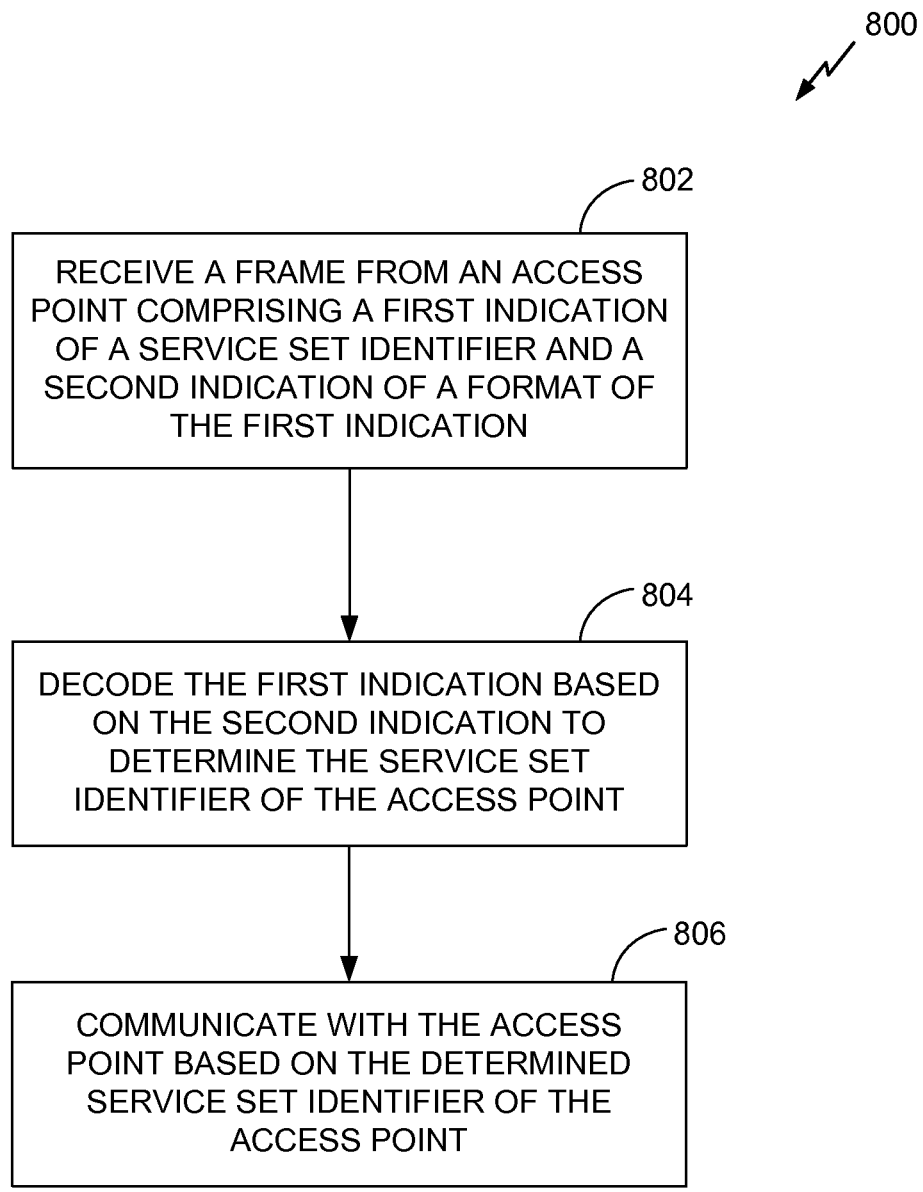
FIG. 8 is a flowchart of a process for communicating data in the wireless communications system of FIG. 1.

FIG. 8 is a flowchart of a process 800 for communicating data in the wireless communications system of FIG. 1. In an embodiment, the process 800 may be performed by a STA, such as any of STAs 106. In some aspects, the process 800 may be performed by the wireless device 602. For example, in some aspects, instructions stored in the memory 606 may configure the processor unit(s) 604 to perform one or more of the functions discussed below with respect to process 800.

In block 802, a frame is received from an access point. The frame includes a first indication of a service set identifier of the access point and a second indication of a format of the first indication. In some aspects, the frame received in block 802 substantially conforms with the format of frame 300 shown in FIG. 3. In some aspects, the discovery frame control field 302 of frame 300 conforms with the enhanced discovery frame control field 302*b* format shown in FIG. 5. For example, in some aspects, the second indication may be stored in the SSID type indicator field 518. The first indication may be stored in the SSID field 308 shown in frame 300. One of skill in the art should understand upon reviewing this disclosure that in various implementations, the frame received in block 802 may conform with any of the specifications disclosed above with respect to Tables 1-4.

In some aspects, block 802 is performed by the receiver 612 of FIG. 6. In some other aspects, block 802 may be performed by one or more of the processor 604, signal detector 618, transmitter 610, receiver 612, and/or DSP 620. In some aspects, receiving the frame from the access point may include the receiver 612 decoding signals from a wireless medium via the antenna 616 to determine a sequence of bit values comprising the frame. Receiving the frame may then further include copying the bit values from a memory space controlled by the receiver 612, such as memory internal to the receiver 612, to other memory, such as memory 606, which may be accessed by the processor 604.

In block 804, the first indication is decoded based on the second indication to determine the service set identifier of the access point. For example, as discussed above with respect to Tables 1 and 2, the SSID type indicator field 518 may be decoded to determine whether the received frame includes a full thirty two byte service set identifier field (for example, in field 308 of frame 300), or whether a compressed service set identifier field is included in the received frame. Thus, in some aspects, a length of the first indication (e.g. the SSID stored in the SSID field 308 of frame 300 in some aspects) is determined based on the second indication. The first indication is then decoded based on the determined length.

For example, if the service set identifier type indicator field 518 is a first value, the first indicator (e.g. the SSID field 308 in some aspects) may be decoded as a thirty two (32) byte service set identifier. If the service set identifier type indicator field 518 has a second value, the first indication (e.g. the SSID field 308 in some aspects) may be decoded as a hash of a SSID of the access point. The hash may be decoded using a predetermined hash length that is less than thirty two (32) bytes if the second indicator has a second value. In some aspects, the predetermined length is four (4) bytes. In some aspects, the hash of the SSID is decoded as a four byte cyclic redundancy check value of a SSID of the access point. As described by Table 1 above, in some aspects, how the first indication is decoded may also be based on one or more bits of the SSID information field 502.

In some aspects, block 804 is performed by the processor 604 of FIG. 6. In some other aspects, block 802 may be performed by one or more of the processor 604, signal detector 618, transmitter 610, receiver 612, and/or DSP 620.

In block 806, the device performing process 800 communicates with the access point based on the determined service set identifier of the access point. For example, in some aspects, the device performing process 800 may associate with the access point based on the decoded service set identifier. Associating with the access point may include transmitting an association request message to the access point, the association request message including the decoded service set identifier. Associating with the access point may also include receiving an association response message from the access point. An association result or status may then be decoded from the association response message to determine whether the association with the access point was successful or not.

In some aspects, the determined service set identifier may be included in one or more message exchanges with the access point in block 806. In some aspects, a hash of the SSID of the access point (referenced above) may be included in one or more message exchanges with the access point in block 806. In some aspects, block 804 is performed by the processor 604 of FIG. 6. In some other aspects, block 802 may be performed by one or more of the processor 604, signal detector 618, transmitter 610, receiver 612, and/or DSP 620.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of communicating on a wireless network, comprising:
   generating, by an access point, a cyclic redundancy check value based on a service set identifier of the access point, the cyclic redundancy check value being generated to be four octets in length;
   generating, by an access point, a frame as a fast initial link setup discovery frame, the frame comprising:
   a first indication of the cyclic redundancy check value, and
   a second indication of a format of the first indication of the cyclic redundancy check value; and
   transmitting the frame.

2. The method of claim 1, further comprising generating the second indication to have a value indicating the frame includes a hashed service set identifier.

3. The method of claim 1, wherein generating the cyclic redundancy check value comprises truncating the service set identifier.

4. The method of claim 3, further comprising generating a service set identifier information field in a control field of the frame to indicate the truncated service set identifier.

5. The method of claim 1, further comprising periodically transmitting the frame.

6. The method of claim 5, wherein the frame is transmitted at a time interval of less than 500 milliseconds.

7. An apparatus for communicating on a wireless network, comprising:
   a processor configured to:
   generate a cyclic redundancy check value based on a service set identifier of an access point, the cyclic redundancy check value being generated to be four octets in length; and
   generate a frame as a fast initial link setup discovery frame, the frame comprising:
   a first indication of the cyclic redundancy check value, and
   a second indication of a format of the first indication of the cyclic redundancy check value; and
   a transmitter configured to transmit the frame.

8. The apparatus of claim 7, wherein the processor is further configured to generate the second indication to have a value indicating the frame includes a hashed service set identifier.

9. The apparatus of claim 7, wherein generating the cyclic redundancy check value comprises truncating the service set identifier.

10. The apparatus of claim 9, wherein the processor is further configured to generate a service set identifier information field in a control field of the frame to indicate the truncated service set identifier.

11. The apparatus of claim 7, wherein the processor is further configured to periodically transmit the frame.

12. The apparatus of claim 11, wherein the frame is transmitted at a time interval of less than 500 milliseconds.

13. An apparatus for communicating on a wireless network, comprising:

means for generating a cyclic redundancy check value based on a service set identifier of an access point, the cyclic redundancy check value being generated to be four octets in length; and means for generating a frame as a fast initial link setup discovery frame, the frame comprising:
  a first indication of the cyclic redundancy check value, and
  a second indication of a format of the first indication of the cyclic redundancy check value; and
means for transmitting the frame.

14. The apparatus of claim 13, wherein the means for generating the cyclic redundancy check value is configured to truncate the service set identifier to generate the hash.

15. The apparatus of claim 14, further comprising means for generating a service set identifier information field in a control field of the frame to indicate the truncated service set identifier.

16. The apparatus of claim 13, further comprising means for generating the second indication to have a value indicating the frame includes a hashed service set identifier.

17. The apparatus of claim 13, further comprising means for periodically transmitting the frame.

18. The apparatus of claim 17, wherein the means for periodically transmitting the frame is configured to generate and transmit the frame at a time interval of less than 500 milliseconds.

19. A non-transitory computer readable storage medium comprising instructions that when executed cause a processor to communicate on a wireless network, the medium comprising instructions for:
  generating a cyclic redundancy check value based on a service set identifier of an access point, the cyclic redundancy check value being generated to be four octets in length;
  generating, by an access point, a frame as a fast initial link setup discovery frame, the frame comprising:
    a first indication of the cyclic redundancy check, and
    a second indication of a format of the first indication of the cyclic redundancy check value; and
  transmitting the frame.

20. The computer readable storage medium of claim 19, the medium further comprising instructions for generating the second indication to have a value indicating the frame includes a hashed service set identifier.

21. The computer readable storage medium of claim 19 wherein generating the cyclic redundancy check comprises truncating the service set identifier.

22. The computer readable storage medium of claim 21, the medium further comprising instructions for generating a service set identifier information field in a control field of the frame to indicate the truncated service set identifier.

23. The computer readable storage medium of claim 19, the medium further comprising instructions for periodically transmitting the frame.

24. The computer readable storage medium of claim 23, wherein the frame is transmitted at a time interval of less than 500 milliseconds.

25. A method of communicating on a wireless network, comprising:
  receiving, from an access point, a fast initial link setup discovery frame, the frame comprising:
    a first indication of a cyclic redundancy check of a service set identifier of the access point, the cyclic redundancy check value being four octets in length, and
    a second indication of a format of the first indication of the cyclic redundancy check value;
  decoding the first indication based on the second indication to determine the service set identifier of the access point; and
  communicating with the access point based on the service set identifier of the access point.

26. The method of claim 25, further comprising determining a length of the first indication based on the second indication and decode the first indication based on the length.

27. The method of claim 25, wherein communicating with the access point includes associating with the access point.

28. The method of claim 25, wherein communicating with the access point comprises including the first indication in one or more message exchanges with the access point.

29. An apparatus for communicating on a wireless network, comprising:
  a receiver configured to receive, from an access point, a fast initial link setup discovery frame, the frame comprising:
    a first indication of a cyclic redundancy check of a service set identifier of the access point, the cyclic redundancy check value being four octets in length, and
    a second indication of a format of the first indication of the cyclic redundancy check value; and
  a processor configured to:
    decode the first indication based on the second indication to determine the service set identifier of the access point, and
    communicate with the access point based on the service set identifier of the access point.

30. The apparatus of claim 29, wherein the processor is further configured to determine a length of the first indication based on the second indication and to decode the first indication based on the length.

31. The apparatus of claim 29, wherein communicating with the access point includes associating with the access point.

32. The apparatus of claim 29, wherein communicating with the access point comprises including the first indication in one or more message exchanges with the access point.

33. An apparatus for communicating on a wireless network, comprising:
  means for receiving, from an access point, a fast initial link setup discovery frame, the frame comprising:
    a first indication of a cyclic redundancy check of a service set identifier of the access point, the cyclic redundancy check value being four octets in length, and
    a second indication of a format of the first indication of the cyclic redundancy check value;
  means for decoding the first indication based on the second indication to determine the service set identifier of the access point; and
  means for communicating with the access point based on the service set identifier of the access point.

34. The apparatus of claim 33, further comprising means for determining a length of the first indication based on the second indication, wherein the means for decoding the first indication is configured to decode the first indication based on the length.

35. The apparatus of claim 33, wherein the means for communicating is configured to associate with the access point based on the first indication.

36. The apparatus of claim 33, wherein the means for communicating is configured to include the first indication in one or more message exchanges with the access point.

37. A non-transitory computer readable storage medium comprising instructions that when executed cause a processor to communicate on a wireless network, the medium comprising instructions for:
- receiving, from an access point, a fast initial link setup discovery frame, the frame comprising:
  - a first indication of a cyclic redundancy check of a service set identifier of the access point, the cyclic redundancy check value being four octets in length, and
  - a second indication of a format of the first indication of the cyclic redundancy check value;
- decoding the first indication based on the second indication to determine the service set identifier of the access point; and
- communicating with the access point based on the service set identifier of the access point.

38. The computer readable storage medium of claim 37, the medium further comprising instructions for determining a length of the first indication based on the second indication, wherein the decoding of the first indication is based on the length.

39. The computer readable storage medium of claim 37, wherein communicating with the access point includes associating with the access point.

40. The computer readable storage medium of claim 37, wherein communicating with the access point comprises including the first indication in one or more message exchanges with the access point.

* * * * *